United States Patent
Enya

(10) Patent No.: US 12,455,471 B2
(45) Date of Patent: Oct. 28, 2025

(54) LIGHT CONTROL SHEET

(71) Applicant: TOPPAN Inc., Taito-ku (JP)

(72) Inventor: Taisuke Enya, Taito-ku (JP)

(73) Assignee: TOPPAN Inc., Taito-ku (JP)

( * ) Notice: Subject to any disclaimer, the term of this patent is extended or adjusted under 35 U.S.C. 154(b) by 0 days.

(21) Appl. No.: 18/309,959

(22) Filed: May 1, 2023

(65) Prior Publication Data

US 2023/0266614 A1 Aug. 24, 2023

Related U.S. Application Data

(63) Continuation of application No. PCT/JP2021/041745, filed on Nov. 12, 2021.

(30) Foreign Application Priority Data

Nov. 13, 2020 (JP) .................... 2020-189124

(51) Int. Cl.
*G02F 1/1334* (2006.01)
*G02F 1/1333* (2006.01)
*G02F 1/1339* (2006.01)
*G02F 1/137* (2006.01)
(Continued)

(52) U.S. Cl.
CPC ...... *G02F 1/1334* (2013.01); *G02F 1/133365* (2013.01); *G02F 1/13392* (2013.01); *G02F 1/13775* (2021.01); *G02F 1/133502* (2013.01); *G02F 1/13398* (2021.01); *G02F 1/13439* (2013.01)

(58) Field of Classification Search
None
See application file for complete search history.

(56) References Cited

U.S. PATENT DOCUMENTS

| | | | | |
|---|---|---|---|---|
| 5,178,571 A | * | 1/1993 | Mase | G02F 1/1334 349/93 |
| 6,341,000 B1 | * | 1/2002 | Inoue | G02F 1/1334 349/86 |
| 2004/0161549 A1 | | 8/2004 | Niyama et al. | |

(Continued)

FOREIGN PATENT DOCUMENTS

| | | |
|---|---|---|
| CN | 111 226 164 A | 6/2020 |
| JP | H08-92561 A | 4/1996 |

(Continued)

OTHER PUBLICATIONS

International Search Report issued Jan. 18, 2022 in International Application No. PCT/JP2021/041745 filed Nov. 12, 2021, 5 pages (with English Translation).

(Continued)

*Primary Examiner* — Dung T Nguyen
(74) *Attorney, Agent, or Firm* — Oblon, McClelland, Maier &Neustadt, L.L.P.

(57) ABSTRACT

A light control sheet including a first transparent electrode layer, a second transparent electrode layer, a light control layer formed between the first transparent electrode layer and the second transparent electrode layer, the light control layer including a transparent polymer layer having voids filled with a liquid crystal composition including liquid crystal molecules, and spacers formed in the light control layer and including polymethyl methacrylate.

14 Claims, 2 Drawing Sheets

(51) Int. Cl.
    *G02F 1/1335*    (2006.01)
    *G02F 1/1343*    (2006.01)

(56)            References Cited

U.S. PATENT DOCUMENTS

2005/0134750 A1*  6/2005  Yano .................... G02F 1/1345
                                                            349/24
2014/0078446 A1   3/2014  Guo et al.
2015/0116638 A1   4/2015  Zhang
2020/0012138 A1*  1/2020  Yamada ................ G02F 1/1334

FOREIGN PATENT DOCUMENTS

JP       2000-119656 A     4/2000
JP       2015-503773 A     2/2015
JP       2015-532982 A    11/2015
JP       2017-187775 A    10/2017
JP        111 226 164 A    6/2020

OTHER PUBLICATIONS

Office Action issued Jun. 15, 2021 in JP Application No. 2020-189124, 5 pages (with English Translation).
Extended European Search Report issued Mar. 25, 2024 in European Application No. 21891994.2, therein, 27 pgs.
Office Action issued Apr. 16, 2024 in corresponding Japanese Patent Application No. 2022-045320 (with English-language Translation), 5 pages.

* cited by examiner

LIGHT CONTROL SHEET

CROSS-REFERENCE TO RELATED APPLICATIONS

The present application is a continuation of International Application No. PCT/JP2021/041745, filed Nov. 12, 2021, which is based upon and claims the benefits of priority to Japanese Application No. 2020-189124, filed Nov. 13, 2020. The entire contents of all of the above applications are incorporated herein by reference.

BACKGROUND OF THE INVENTION

Field of the Invention

The present disclosure relates to a light control sheet attached, for example, to a transparent member provided in various windows of a vehicle.

Discussion of the Background

A light control sheet includes a first transparent electrode layer, a second transparent electrode layer, and a light control layer. The light control layer is interposed between the first transparent electrode layer and the second transparent electrode layer. The light control layer may include, for example, a transparent polymer layer and a liquid crystal composition. The transparent polymer layer has voids, and each void is filled with the liquid crystal composition. The liquid crystal composition contains liquid crystal molecules. The liquid crystal molecules have different orientations in a state where no potential difference is applied between the pair of transparent electrode layers and a state where a potential difference is applied between the pair of transparent electrode layers. For example, the light control sheet has an opaque state due to the orientation in the state where no potential difference is applied between the pair of transparent electrode layers, and a transparent state due to the orientation in the state where a potential difference is applied between the pair of transparent electrode layers (see, for example, JP 2017-187775 A).

SUMMARY OF THE INVENTION

According to an aspect of the present invention,

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
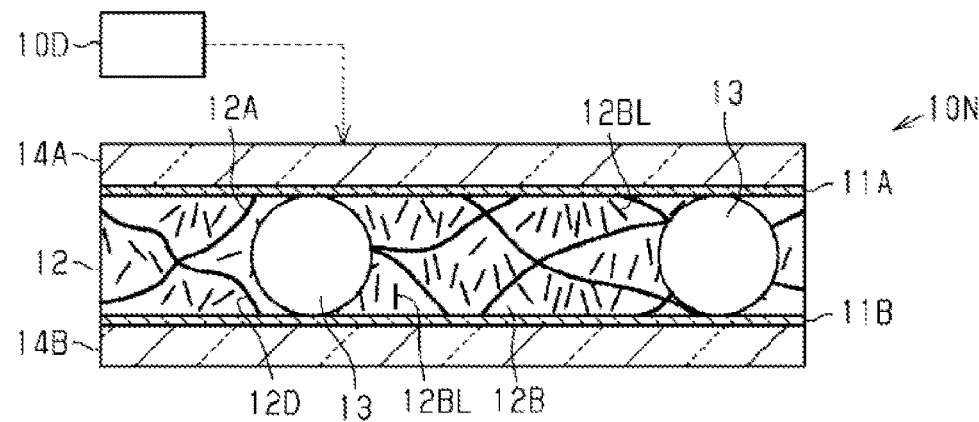
FIG. 1 is a cross-sectional view showing a state in which no voltage difference is applied between the transparent electrode layers in a normal-type light control sheet.

The embodiments will now be described with reference to the accompanying drawings, wherein like reference numerals designate corresponding or identical elements throughout the various drawings.

An embodiment of the light control sheet will be described with reference to FIGS. 1 to 4. The light control sheet and the Examples will be described in sequence.

<Light Control Sheet>

The light control sheet is attached to a transparent member fitted to a window of a vehicle. The transparent member may be, for example, windshield glass, side window glass, rear window glass, roof glass, or the like. The light control sheet has flexibility that allows it to follow the shape of the transparent member. Therefore, when the light control sheet is attached to the transparent member, the light control sheet may have a curved shape. The light control sheet may be a normal-type or reverse-type light control sheet.

Figure 2:
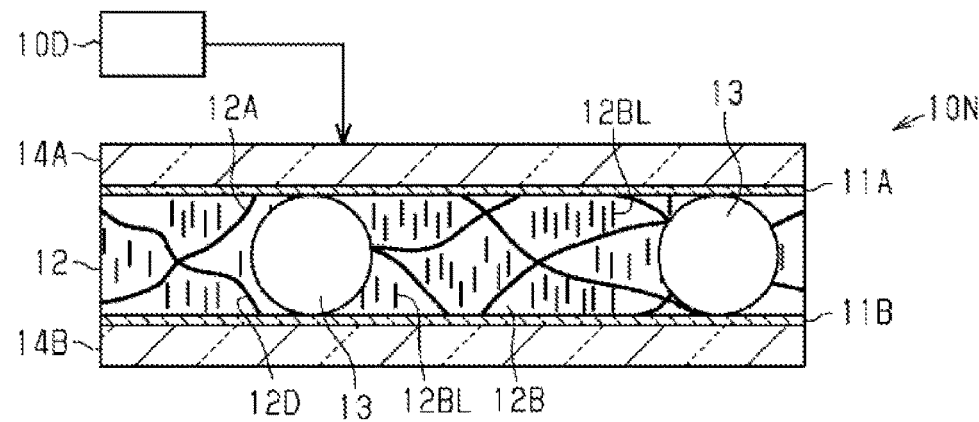
FIG. 2 is a cross-sectional view showing a state in which a voltage difference is applied between the transparent electrode layers in the normal-type light control sheet.

A normal-type light control sheet and a light control device provided with the normal-type light control sheet will be described with reference to FIGS. 1 and 2. FIG. 1 shows a cross-sectional structure of a normal-type light control sheet when the light control sheet is in an opaque state, and FIG. 2 shows a cross-sectional structure of a normal-type light control sheet when the light control sheet is in a transparent state.

As shown in FIG. 1, the light control sheet 10N includes a first transparent electrode layer 11A, a second transparent electrode layer 11B, a light control layer 12, and spacers 13. The light control layer 12 is interposed between the first transparent electrode layer 11A and the second transparent electrode layer 11B. The light control layer 12 includes a transparent polymer layer 12A and a liquid crystal composition 12B. The transparent polymer layer 12A contains voids 12D. The liquid crystal composition 12B contains liquid crystal molecules 12BL and fills the voids 12D. The spacers 13 are located in the light control layer 12.

The spacers 13 are formed of polymethyl methacrylate (PMMA). PMMA contains the unit structure shown below, and has a structure in which the unit structure is repeated. PMMA is a polymer of methyl methacrylate ($C_5H_8O_2$), which is composed of a saturated hydrocarbon. The spacers 13 are formed of PMMA in which only methyl methacrylate monomers have been polymerized, or in other words, are formed of a homopolymer of methyl methacrylate.

<Chemical Formula 1>

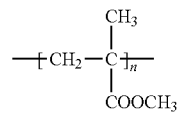

Conventionally, the spacers 13 provided in the light control sheet 10N have frequently used a material containing aromatic rings, such as spacers mainly composed of divinylbenzene shown below.

<Chemical Formula 2>

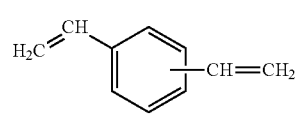

In spacers made of a material containing aromatic rings, the portions containing the aromatic rings are liberated when used in a harsh environment, especially in a high-temperature environment. Because the liberated aromatic rings interact with the liquid crystal molecules 12BL included in the light control layer 12 and prevent the liquid crystal molecules 12BL from being driven, the optical properties of the light control sheet 10N deteriorate when a voltage for driving the liquid crystal molecules 12BL is applied to the light control sheet 10N. Therefore, in the normal-type light control sheet 10N, the optical characteristics of the light control sheet 10N deteriorate when the light control sheet 10N is in the transparent state. For example, the haze of the light control sheet 10N in the transparent state increases.

In this regard, according to the light control sheet 10N of the present disclosure, because the spacers 13 are formed of PMMA composed of a saturated hydrocarbon, deterioration in the optical properties of the light control sheet 10N is suppressed in a high-temperature environment. Thus, the reliability of the light control sheet 10N is enhanced. As mentioned above, the light control sheet 10N is a light control sheet for mounting on a vehicle. The components mounted on a vehicle must meet the high safety standards imposed on vehicles. Therefore, the light control sheet 10N for mounting on a vehicle is required to have higher reliability than in other applications. In this regard, according to the light control sheet 10N provided with spacers 13 formed of PMMA, because the reliability at high temperatures can be enhanced, the light control sheet 10N is suitable as a light control sheet for mounting on a vehicle.

The light control sheet 10N preferably satisfies Condition 1.

(Condition 1) The absolute value of the difference between the refractive index of the transparent polymer layer 12A and the refractive index of the spacers 13 is 0.04 or less.

Because the absolute value of the difference between the refractive index of the transparent polymer layer 12A and the refractive index of the spacers 13 is 0.04 or less, when the light control sheet 10N is in the transparent state, white turbidity of the light control sheet 10N originating from the scattering of incident light caused by the difference in the refractive indexes of the transparent polymer layer 12A and the spacers 13 is suppressed. In the normal-type light control sheet 10N, a potential difference is applied between the first transparent electrode layer 11A and the second transparent electrode layer 11B, and the light control sheet 10N is transparent when the liquid crystal molecules are driven by the potential difference. Consequently, when the absolute value of the difference in the refractive indexes described above is 0.04 or less, it is possible to enhance the transparency of the light control sheet 10N when a potential difference is applied between the transparent electrode layers 11A and 11B.

The retention mode of the liquid crystal composition in the light control layer 12 is any one selected from a group consisting of a polymer network-type, a polymer dispersion-type, and a capsule-type. The transparent polymer layer 12A has a structure that corresponds to a retention mode of the liquid crystal composition. The polymer network-type includes a polymer network having a three-dimensional mesh shape. A polymer network is an example of the transparent polymer layer 12A. The polymer network holds the liquid crystal composition in the interconnected voids of the network. The polymer dispersion-type includes a transparent polymer layer 12A that defines a large number of isolated voids, and holds the liquid crystal composition in the voids dispersed in the transparent polymer layer 12A. The capsule-type holds an encapsulated liquid crystal composition in the transparent polymer layer 12A. Note that FIGS. 1 to 4 show the light control sheet when the retention mode of the liquid crystal composition is the polymer network-type.

The transparent polymer layer 12A is a polymer of an ultraviolet polymerizable compound. The transparent polymer layer 12A may be formed of two or more types of ultraviolet polymerizable compounds. For example, the two or more ultraviolet polymerizable compounds may include an ultraviolet polymerizable compound containing aromatic rings. That is, the transparent polymer layer 12A may be formed of a polymer in which two or more types of unit structures have been polymerized. One or more of the two or more types of unit structures may include a unit structure containing aromatic rings.

Because the transparent polymer layer 12A has a structure in which the polymer forming the transparent polymer layer 12A is intricately entangled, even if one or more types of unit structures forming the transparent polymer layer 12A contain aromatic rings, liberation of the aromatic rings is less likely to occur compared to a case where the spacers 13 are formed of a material containing aromatic rings. In this regard, according to the light control sheet described above, because a unit structure containing aromatic rings can be used for the two or more types of unit structures forming the transparent polymer layer 12A, it is possible to increase the degree of freedom in selecting the material forming the transparent polymer layer 12A, and by extension, the degree of freedom in the refractive index of the transparent polymer layer.

The light control layer 12 may be formed, for example, by irradiating ultraviolet light to a coating film. The coating film is a mixture of the ultraviolet polymerizable compound for forming the transparent polymer layer 12A and the liquid crystal composition 12B.

When the transparent polymer layer 12A contains a unit structure that contains aromatic rings, the average number of the aromatic rings contained in the two or more types of unit structures in the transparent polymer layer 12A may be 0.4 or more per unit structure. The liquid crystal molecules 12BL may contain aromatic rings. When the liquid crystal molecules 12BL contain aromatic rings, because one or more of the two types of unit structures included in the transparent polymer layer 12A, that is, the monomers for forming the transparent polymer layer 12A contain aromatic rings, the compatibility of the monomers with respect to the liquid crystal molecules 12BL can be enhanced in the coating liquid for forming the light control sheet 10N. As a result, the distribution of the liquid crystal molecules 12BL and the monomers in the coating liquid is not biased, that is, the liquid crystal molecules 12BL and the monomers are each dispersed in the coating liquid. This makes it possible to form voids 12D having a size of 1 μm or more and 10 μm or less by irradiating the coating film formed using the coating liquid with ultraviolet light to induce a phase separation. In order to make it possible to form the voids 12D of such a size, the average number of aromatic rings included per unit structure in the transparent polymer layer 12A is preferably 0.4 or more from the viewpoint of enhancing the compatibility of the monomers with respect to the liquid crystal molecules 12BL.

The size of the voids 12D can be recognized in a cross-section taken along a plane perpendicular to the plane in which the transparent polymer layer 12A expands. In the cross section, the size of a void 12D is the length of the longest line segment among the line segments connecting any two points on the edge of the void 12D. For example, when a void 12D has a circular shape, the diameter of the void 12D is the size of the void 12D. When a void 12D has an oval shape, the long axis of the void 12D is the size of the void 12D. When a void 12D has a shape other than a circular shape or an oval shape, the diameter of a circle that circumscribes the void 12D may be the size of the void 12D.

On the other hand, when the light control sheet 10N includes spacers 13 containing divinylbenzene as the main component, from the viewpoint of enhancing the reliability of the light control sheet 10N at high temperatures, that is, from the viewpoint of suppressing an increase in the haze value when exposed to high temperatures while transparent, the transparent polymer layer 12A preferably contains aromatic rings. As a result, the interaction between the aromatic rings included in the liquid crystal molecules and the aromatic rings included in the spacers 13 is suppressed by the aromatic rings included in the transparent polymer layer 12A, which is considered to enhance the reliability at high temperatures. However, from the viewpoint of increasing the compatibility of the monomers with respect to the liquid crystal molecules 12BL, an excessive increase in the number of aromatic rings in the transparent polymer layer 12A leads to a decrease in compatibility.

In this regard, according to the light control sheet 10N of the present disclosure, by changing the material forming the spacers 13 from a material containing aromatic rings to PMMA, it is possible to enhance the reliability at high temperatures. Therefore, the number of aromatic rings per unit structure of the transparent polymer layer 12A can be set from the viewpoint of the compatibility between the monomers for forming the transparent polymer layer 12A and the liquid crystal molecules 12BL.

The liquid crystal composition 12B fills the voids 12D. For example, the liquid crystal molecules 12BL may be composed of one type of material selected from the group consisting of Schiff bases, azo-based molecules, azoxy-based molecules, biphenyls, terphenyls, benzoic acid esters, tolan types, pyrimidines, cyclohexanecarboxylic acid esters, phenylcyclohexanes, and dioxanes. The liquid crystal molecules 12BL may contain aromatic rings as mentioned above. The liquid crystal composition 12B may include first liquid crystal molecules 12BL and second liquid crystal molecules 12BL which are of a different type to the first liquid crystal molecules 12BL. The main component of the liquid crystal composition 12B is the liquid crystal molecules 12BL.

The weight concentration of the main component in the liquid crystal composition 12B is 80% or more with respect to the liquid crystal composition 12B. The liquid crystal composition 12B may contain, as components other than the main component, a dichroic pigment, a weather resistant agent, and an unavoidable components that is mixed when forming the light control layer 12. The weather resistant agent is an ultraviolet absorber or light stabilizer for suppressing deterioration of the liquid crystal composition 12B. The unavoidable component may be, for example, an unreacted component of the ultraviolet polymerizable compound used to form the transparent polymer layer 12A.

The spacers 13 are dispersed in the light control layer 12. The length of the spacers 13 in the thickness direction of the light control layer 12 is substantially equal to the thickness of the light control layer 12. The spacers 13 suppress variations in the thickness of the light control layer 12. The light control sheet 10N may include spacers having a first size and spacers having a second size. The spacers 13 may be, for example, particulate spacers. Particulate spacers include spherical spacers and non-spherical spacers. Non-spherical spacers include rectangular parallelepiped spacers, cross-shaped spacers, and rod-shaped spacers. As mentioned above, the spacers 13 are made of PMMA.

The spacers 13 may have fixability with respect to other layers in contact with the light control layer 12. For example, the spacers 13 may be spacers that have been subjected to surface treatment so as to adhere to the transparent electrode layers 11A and 11B, or a resin layer in contact with the light control layer 12.

The pair of transparent electrode layers 11A and 11B sandwich the light control layer 12 in the thickness direction of the light control layer 12. Each of the transparent electrode layers 11A and 11B allows light in the visible light region to be transmitted therethrough. For example, the transparent electrode layers 11A and 11B may each be composed of one type of material selected from the group consisting of indium tin oxide, fluorine-doped tin oxide, tin oxide, zinc oxide, carbon nanotubes, poly(3,4-ethylenedioxythiophene), and silver.

The light control sheet 10N includes a first transparent substrate 14A and a second transparent substrate 14B. The pair of transparent substrates 14A and 14B sandwiches the pair of transparent electrode layers 11A and 11B in the thickness direction of the light control layer 12. The transparent substrates 14A and 14B allow visible light to be transmitted therethrough. The material forming the transparent substrates 14A and 14B may be, for example, transparent glass or transparent synthetic resin.

The light control layer 12 has a transparent state and an opaque state. In the light control layer 12, the orientation of the liquid crystal molecules 12BL changes in response to application of a voltage that changes the orientation of the liquid crystal molecules 12BL. The light control layer 12 switches between the transparent state and the opaque state based on the change in orientation of the liquid crystal molecules 12BL. The transparent state of the light control layer 12 is a state in which the outline of an observation target can be visually recognized through the light control sheet 10N. The opaque state of the light control layer 12 is a state in which the outline of an observation target cannot be visually recognized through the light control sheet 10N.

The light control sheet 10N in FIG. 1 shows a state in which a voltage for changing the orientation is not applied. When the voltage for changing the orientation is not applied to the light control layer 12, the orientation direction of the liquid crystal molecules 12BL located in each void 12D is random. The light incident on the light control sheet 10N from either one of the pair of transparent substrates 14A and 14B is scattered in various directions in the light control layer 12. As a result, the normal-type light control layer 12 is in the opaque state, which is a turbid state, when no voltage is applied. The light control layer 12 in the opaque state may be white and in a turbid state, or may be colored and in a turbid state. When the light control layer 12 is colored, the light control layer 12 contains a pigment.

As shown in FIG. 2, when the voltage for changing the orientation of the liquid crystal molecules 12BL is applied to the light control layer 12 from a driver circuit 10D, the orientation of the liquid crystal molecules 12BL changes from a random orientation to a direction that allows light to be transmitted therethrough. For example, the liquid crystal molecules 12BL change the orientation such that the long axis of the liquid crystal molecules 12BL is substantially perpendicular to the plane in which the light control layer 12 expands. The light that is incident on the light control sheet 10N from either of the pair of transparent substrates 14A and 14B is transmitted through the light control layer 12 without substantially being scattered in the light control layer 12. As a result, the normal-type light control layer 12 is in the transparent state when the voltage is applied.

Figure 3:
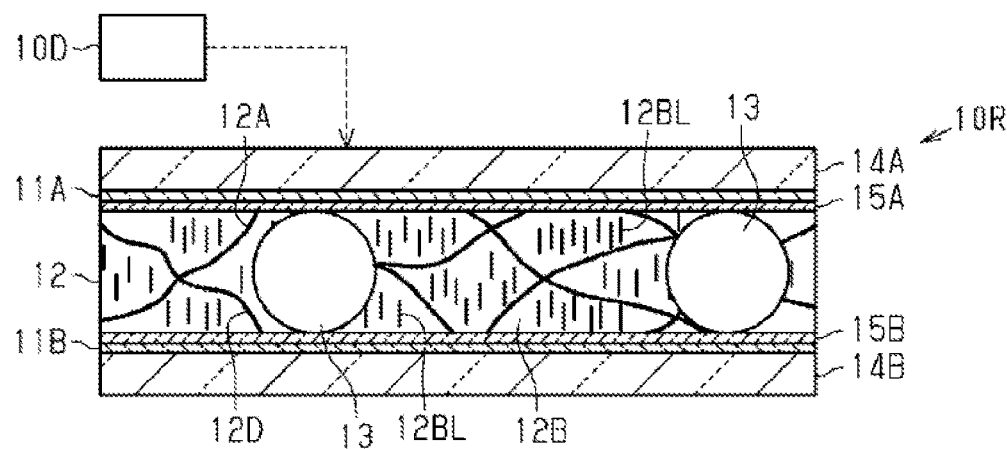
FIG. 3 is a cross-sectional view showing a state in which no voltage difference is applied between the transparent electrode layers in a reverse-type light control sheet.
Figure 4:
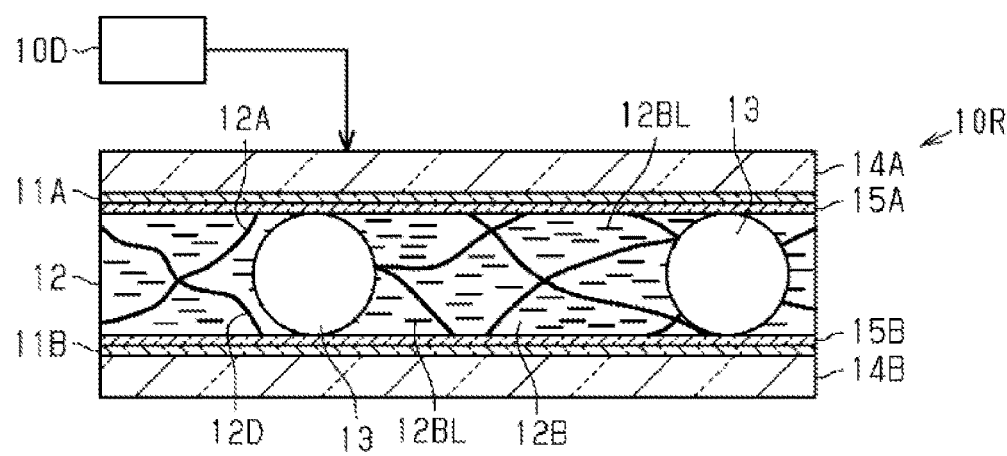
FIG. 4 is a cross-sectional view showing a state in which a voltage difference is applied between the transparent electrode layers in the reverse-type light control sheet.

A reverse-type light control sheet and a light control device including the reverse-type light control sheet will be described with reference to FIGS. 3 and 4. FIG. 3 shows a cross-sectional structure when the reverse-type light control layer 12 is in the transparent state, and FIG. 4 shows a cross-sectional structure when the reverse-type light control layer 12 is in the opaque state.

As shown in FIG. 3, the reverse-type light control sheet 10R includes, in addition to the pair of transparent electrode layers 11A and 11B, the light control layer 12, and the pair of transparent substrates 14A and 14B, a pair of alignment layers 15A and 15B. The pair of alignment layers 15A and 15B sandwich the light control layer 12 in the thickness direction of the light control layer 12, and are located closer to the central portion of the light control sheet 10R than the pair of transparent electrode layers 11A and 11B in the thickness direction of the light control layer 12 are.

The first alignment layer 15A is located between the light control layer 12 and the first transparent electrode layer 11A. The first alignment layer 15A exerts an orientation regulation force on the liquid crystal molecules 12BL. The second alignment layer 15B is located between the light control layer 12 and the second transparent electrode layer 11B. The second alignment layer 15B exerts an orientation regulation force on the liquid crystal molecules 12BL. The material forming the alignment layers 15A and 15B may be an organic compound, an inorganic compound, or a mixture thereof. The organic compound may be, for example, a polyimide, polyamide, polyvinyl alcohol, cyanide compound, or the like. The inorganic compound may be silicon oxide, zirconium oxide, or the like. Furthermore, the material forming the alignment layers 15A and 15B may be silicone.

When the alignment layers 15A and 15B are vertical alignment layers, the orientation direction of the liquid crystal molecules 12BL located in the voids 12D is the vertical direction when the voltage for changing the orientation of the liquid crystal molecules 12BL is not applied to the light control layer 12. Further, the light that is incident on the light control sheet 10R from either of the pair of transparent substrates 14A and 14B is transmitted through the light control layer 12 without substantially being scattered in the light control layer 12. As a result, the reverse-type light control layer 12 is in the transparent state when the voltage for changing the orientation of the liquid crystal molecules 12BL is not applied.

As shown in FIG. 4, when the voltage for changing the orientation of the liquid crystal molecules 12BL is applied to the light control layer 12 from the driver circuit 10D, the orientation of the liquid crystal molecules 12BL changes, for example, from a vertical alignment to a horizontal alignment. In this case, the liquid crystal molecules 12BL are located in the voids 12D such that the long axis of the liquid crystal molecules 12BL extends along the plane in which the light control layer 12 expands. The light incident on the light control sheet 10R from either one of the pair of transparent substrates 14A and 14B is scattered by the light control layer 12. As a result, the reverse-type light control layer 12 is in the opaque state when the voltage for changing the orientation of the liquid crystal molecules 12BL is applied.

EXAMPLES

Examples and Comparative Examples will be described with reference to Table 1. In the Examples and Comparative Examples described below, the transparent polymer layer was formed using a plurality of monomers selected from among the first monomer to the seventh monomer listed below.

<Monomer Types>
 First monomer: hexyl acrylate (refractive index: 1.428)
 Second monomer: dodecyl acrylate (refractive index: 1.443)
 Third monomer: ethoxylated o-phenylphenol acrylate (refractive index 1.577)
 Fourth monomer: cyclohexyl acrylate (refractive index: 1.460)
 Fifth monomer: pentaerythritol triacrylate (refractive index: 1.480)
 Sixth monomer: 9,9-bis[4-(2-acryloyloxyethoxy)phenyl] fluorene (refractive index: 1.622)
 Seventh monomer: urethane acrylate (CN962; manufactured by Sartomer Japan Inc.) (refractive index: 1.482)

Example 1

Based on the total solid content in the coating liquid for forming the light control layer, the quantity of liquid crystals including liquid crystal molecules containing aromatic rings (MLC-6609; manufactured by Merck & Co., Inc.) was set to 50% by mass, the amount of the first monomer was set to 9% by mass, the amount of the fourth monomer was set to 18% by mass, the amount of the fifth monomer was set to 6% by mass, and the amount of the seventh monomer was set to 15% by mass. As a result, the refractive index of the coating liquid in the cured state of the material forming the transparent polymer layer was adjusted to 1.50. Furthermore, based on the total solid content in the coating liquid, the amount of a polymerization initiator (Omnirad 184 (Irgacure 184); manufactured by IGM Resins) (Omnirad and Irgacure are registered trademarks) was set to 1% by mass, and the quantity of spacers made of PMMA having a diameter of 15 μm (SD-BD15; manufactured by Hayakawa Rubber Co., Ltd.) (refractive index: 1.50) was set to 1% by mass.

A pair of transparent substrates supporting a transparent conductive film was prepared. The coating liquid was cured by irradiating the coating liquid with ultraviolet light while sandwiching the coating liquid between the pair of transparent conductive films. As a result, the light control sheet of Example 1 was obtained.

Example 2

The light control sheet of Example 2 was obtained in the same manner as in Example 1, except that the composition of the coating liquid in Example 1 was changed as follows. That is, based on the total solid content in the coating liquid, the amount of the second monomer was set to 9% by mass, the amount of the fourth monomer was set to 18% by mass, the amount of the fifth monomer was set to 6% by mass, and the amount of the seventh monomer was set to 15% by mass. Furthermore, the quantity of the other monomers was set to 0% by mass. As a result, the refractive index in the cured state of the material forming the transparent polymer layer was adjusted to 1.51.

Example 3

The light control sheet of Example 3 was obtained in the same manner as in Example 1, except that the spacers were changed to spacers having a diameter of 17 μm (SD-BD17; manufactured by Hayakawa Rubber Co., Ltd.) (refractive index: 1.50), which are spacers having a different diameter to those used in Example 1.

Example 4

The light control sheet of Example 4 was obtained in the same manner as in Example 3, except that the composition of the coating liquid in Example 3 was changed as follows. That is, based on the total solid content in the coating liquid, the amount of the third monomer was set to 9% by mass, the amount of the fourth monomer was set to 18% by mass, the amount of the sixth monomer was set to 6% by mass, and the amount of the seventh monomer was set to 15% by mass. Furthermore, the quantity of the other monomers was set to 0% by mass. As a result, the refractive index in the cured state of the material forming the transparent polymer layer was adjusted to 1.55.

Example 5

The light control sheet of Example 5 was obtained in the same manner as in Example 3, except that the composition of the coating liquid in Example 3 was changed as follows. That is, based on the total solid content in the coating liquid, the amount of the second monomer was set to 18% by mass, the amount of the third monomer was set to 10% by mass, the amount of the sixth monomer was set to 5% by mass, and the amount of the seventh monomer was set to 15% by mass. Furthermore, the quantity of the other monomers was set to 0% by mass. As a result, the refractive index in the cured state of the material forming the transparent resin layer was adjusted to 1.54.

Example 6

The light control sheet of Example 6 was obtained in the same manner as in Example 3, except that the composition of the coating liquid in Example 3 was changed as follows. That is, based on the total solid content in the coating liquid, the amount of the third monomer was set to 27% by mass, the amount of the sixth monomer was set to 6% by mass, and the amount of the seventh monomer was set to 15% by mass. Furthermore, the quantity of the other monomers was set to 0% by mass. As a result, the refractive index in the cured state of the material forming the transparent polymer layer was adjusted to 1.59.

Comparative Example 1

The light control sheet of Comparative Example 1 was obtained using the same method as in Example 4, except that divinylbenzene copolymer spacers (SP-215 manufactured by Sekisui Chemical Co., Ltd.) (refractive index: 1.57) were used instead of those used in Example 4.

Comparative Example 2

The light control sheet of Comparative Example 2 was obtained using the same method as in Example 1, except for using divinylbenzene copolymer spacers (SP-215 manufactured by Sekisui Chemical Co., Ltd.) (refractive index: 1.57) instead of those used in Example 1.

Comparative Example 3

The light control sheet of Comparative Example 3 was obtained using the same method as in Example 1, except for using divinylbenzene copolymer spacers (SP-215 manufactured by Sekisui Chemical Co., Ltd.) (refractive index: 1.57) instead of those used in Example 1.

Comparative Example 4

The light control sheet of Comparative Example 4 was obtained in the same manner as in Comparative Example 3, except that the composition of the coating liquid in Comparative Example 3 was changed as follows. That is, based on the total solid content in the coating liquid, the amount of the second monomer was set to 27% by mass, the amount of the fifth monomer was set to 6% by mass, and the amount of the seventh monomer was set to 15% by mass. Furthermore, the quantity of the other monomers was set to 0% by mass. As a result, the refractive index in the cured state of the material forming the transparent polymer layer was adjusted to 1.50.

TABLE 1

| | % by mass | Ex 1 | Ex 2 | Ex 3 | Ex 4 | Ex 5 | Ex 6 | Comp 1 | Comp 2 | Comp 3 | Comp 4 |
|---|---|---|---|---|---|---|---|---|---|---|---|
| | Liquid crystals | | | | | | | | 50 | | |
| First monomer | Hexyl acrylate | 9 | 0 | 9 | | | 0 | | 9 | 0 | |
| Second monomer | Dodecyl acrylate | 0 | 9 | 0 | | 18 | 0 | 0 | 0 | | 27 |
| Third monomer | Ethoxylated o-phenylphenol acrylate | | 0 | 9 | 10 | 27 | | 9 | 0 | 27 | 1 |
| Fourth monomer | Cyclohexyl acrylate | 18 | | | 0 | | | 18 | | 0 | |
| Fifth monomer | Pentaerythritol triacrylate | 6 | | | 0 | | | 6 | 0 | | 6 |
| Sixth monomer | 9,9,-bis[4-(2-acryloxyethoxy)phenyl]fluorene | 0 | | 6 | 5 | | 6 | 0 | | 6 | 0 |
| Seventh Monomer | Urethane acrylate | | | | | | | | 15 | | |
| | Polymerization initiator | | | | | | | | 1 | | |
| Spacer | PMMA (diameter: 15 μm) | 1 | | | | | | | 0 | | |
| | PMMA (diameter: 17 μm) | 0 | | | 1 | | | | | 0 | |
| | Divinyl benzene | | | | 0 | | | | | | 1 |

Evaluation Method

The haze in the transparent state was measured for each of the light control sheets. Here, the haze of the light control sheets was measured using a method based on JIS K 7136:2000. Furthermore, the haze when a voltage that saturates the haze value of the light control sheet was applied between the pair of transparent electrode layers was measured as the haze in the transparent state. Then, each of the light control sheets was subjected to an accelerated test by allowing each of the light control sheets to stand for 720 hours in an environment maintained at 110° C. After the accelerated test, the haze in the transparent state of each of the light control sheets was measured using the same method as before the test.

For each of the measurements performed before and after the test, cases where the haze value was less than 4% were set to "Excellent", cases where the haze value was 4% or more and less than 5% were set to "Good", cases where the haze value was 5% or more and 6% or less were set to "Fair", and cases where the haze value exceeded 6% were set to "Poor".

<Evaluation Results>

The results of the haze measurements both before and after the accelerated test are shown in Table 2 below. It can be seen that the refractive index of the transparent polymer layers obtained when the monomers were cured in a composition excluding the liquid crystals was higher by 0.04 than the refractive index in the liquid state. It is assumed that the refractive index of the obtained transparent polymer layer is higher by 0.04 than the refractive index in the liquid state because, even when the monomers are cured in a composition containing liquid crystals, the curing of the monomers proceeds in a state where they are separated from the liquid crystals.

Furthermore, for the transparent polymer layer provided in each of the light control sheets, the molar fraction of each of the monomers used for forming the transparent polymer layer was calculated, and then the number of aromatic rings included in each of the monomers was multiplied by the molar fraction of that monomer, which enabled the number of aromatic rings originating from each of the monomers per unit structure to be calculated. Then, the total number of aromatic rings originating from each of the monomers was calculated, which enabled the average number of aromatic rings per unit structure of the transparent polymer layer to be calculated.

before and after the accelerated test. From these results, according to the light control sheets of Examples 1 to 6, it is observed that the reliability of the light control sheet at high temperatures is enhanced by using PMMA spacers.

Note that, when the haze of the light control sheet of Comparative Example 3 after the accelerated test and the haze of the light control sheet of Comparative Example 4 after the accelerated test were compared, it was observed that the haze of the light control sheet of Comparative Example 4 was significantly higher than the haze of the light control sheet of Comparative Example 3. That is, in a light control sheet provided with spacers containing divinyl benzene, it can be said that it is possible to enhance the reliability of the light control sheet at high temperatures by containing aromatic rings in the unit structures included in the transparent polymer layer.

Furthermore, because an "Excellent" haze value was observed for Examples 1 to 3, Example 5, Comparative Example 1 and Comparative Example 3 before the accelerated test, it can be said that the absolute value of the difference between the refractive index of the transparent polymer layer and the refractive index of the spacers is preferably less than 0.05 in order to reduce the haze value in the transparent state. That is, it can be said that the absolute value of the difference between the refractive index of the transparent polymer layer and the refractive index of the spacers is preferably less than 0.05 in order to reduce the haze value in the transparent state before the heating test, or in other words, in order to reduce the initial value of the haze value in the transparent state.

Note that, in Examples 4 to 6, the change in the haze value obtained by subtracting the haze value before the accelerated

TABLE 2

| | | Examples | | | | | | Comparative Examples | | | |
|---|---|---|---|---|---|---|---|---|---|---|---|
| | | 1 | 2 | 3 | 4 | 5 | 6 | 1 | 2 | 3 | 4 |
| Refractive index | Transparent polymer layer | 1.50 | 1.51 | 1.50 | 1.55 | 1.54 | 1.59 | 1.55 | 1.50 | 1.59 | 1.50 |
| | Spacer | 1.50 | 1.50 | 1.50 | 1.50 | 1.50 | 1.50 | 1.57 | 1.57 | 1.57 | 1.57 |
| | Difference in refractive index | 0.00 | 0.01 | 0.00 | 0.05 | 0.04 | 0.09 | 0.02 | 0.07 | 0.02 | 0.07 |
| Number of aromatic rings | Average value | 0.0 | 0.0 | 0.0 | 0.6 | 0.8 | 2.0 | 0.6 | 0.0 | 2.0 | 0.0 |
| Haze | Before test | Excellent | Excellent | Excellent | Good | Excellent | Fair | Excellent | Fair | Excellent | Fair |
| | After test | Good | Good | Good | Fair | Fair | Fair | Poor | Poor | Poor | Poor |

As shown in Table 2, before the accelerated test, an "Excellent" haze value was observed for the light control sheets of Examples 1 to 3, Example 5, Comparative Example 1, and Comparative Example 3. Furthermore, before the accelerated test, a "Good" haze value was observed for the light control sheet of Example 4. In contrast, before the accelerated test, a "Fair" haze value was observed for the light control sheets of Example 6, Comparative Example 2, and Comparative Example 4.

After the accelerated test, a "Good" haze value was observed for the light control sheets of Examples 1 to 3. In addition, after the accelerated test, a "Fair" haze value was observed for the light control sheets of Examples 4 to 6. In contrast, a "Poor" haze value was observed for the light control sheets of Comparative Examples 1 to 4. Therefore, in the light control sheets of Examples 1 to 6, the haze values did not change between before and after the accelerated test, while in the light control sheets of Comparative Examples 1 to 4, a change was observed in the haze values between test from the haze value after the accelerated test was found to be lower than the change in Examples 1 to 3. In particular, in Examples 4 to 6, it was observed that Example 6 had the smallest change in the haze value. From these results, it can be said that the change in the haze value between before and after the heating test can be reduced by including aromatic rings in the transparent polymer layer.

As described above, the light control sheet according to an embodiment achieves the following advantageous effects.

(1) Because the spacers 13 are formed of PMMA composed of a saturated hydrocarbon, deterioration in the optical properties of the light control sheets 10N and 10R is suppressed in a high-temperature environment. Therefore, the reliability of the light control sheets 10N and 10R is enhanced.

(2) Because the absolute value of the difference between the refractive index of the transparent polymer layer 12A and the refractive index of the spacers 13 is 0.04 or less, when the light control sheets 10N and 10R are in the transparent state, white turbidity of the light control sheets 10N and 10R due to scattering of incident light caused by the difference between the refractive indexes of the transparent polymer layer 12A and the spacers 13 is suppressed.

(3) When a unit structure containing aromatic rings is used for the unit structure forming the transparent polymer layer 12A, it is possible to increase the degree of freedom in selecting the material forming the transparent polymer layer 12A, and by extension, the degree of freedom in the refractive index of the transparent polymer layer.

The present application addresses the following. Because light control sheets can have a transparent state and an opaque state, they are used as a partition to separate a first space and a second space when two spaces are adjacent to each other via the light control sheet. For example, light control sheets may be attached to a transparent member fitted to a window of a building, a partition that separates an indoor space in a building, and the like. In recent years, as the range of applications of light control sheets has broadened, attachment of light control sheets to a transparent member provided in the various windows of a vehicle has been proposed. Because vehicles are expected to be used in harsher environments than buildings, and especially at higher temperatures, light control sheets are required to have high reliability even in the environments in which vehicles could be used.

An aspect of the present invention is to provide a light control sheet capable of enhancing the reliability.

An aspect of the light control sheet includes: a first transparent electrode layer; a second transparent electrode layer; a light control layer interposed between the first transparent electrode layer and the second transparent electrode layer, the light control layer including a transparent polymer layer and a liquid crystal composition, the transparent polymer layer having voids, the liquid crystal composition containing liquid crystal molecules and filling the voids; and spacers disposed in the light control layer. Each of the spacers is formed of polymethyl methacrylate.

REFERENCE SIGNS LIST 10N, 10R . . . Light control sheet
11A . . . First transparent electrode layer
11B . . . Second transparent electrode layer
12 . . . Light control layer
13 . . . Spacer
14A . . . First transparent substrate
14B . . . Second transparent substrate
15A . . . First alignment layer
15B . . . Second alignment layer Obviously, numerous modifications and variations of the present invention are possible in light of the above teachings. It is therefore to be understood that within the scope of the appended claims, the invention may be practiced otherwise than as specifically described herein.

What is claimed is:

1. A light control sheet, comprising:
a first transparent substrate;
a second transparent substrate facing the first transparent substrate;
a first transparent electrode layer formed on the first transparent substrate;
a second transparent electrode layer formed on the second transparent substrate;
a light control layer formed between the first transparent electrode layer formed on the first transparent substrate and the second transparent electrode layer formed on the second transparent substrate; and
a plurality of spacers formed in the light control layer and comprising polymethyl methacrylate such that the spacers are dispersed in the light control layer between the first transparent electrode layer and the second transparent electrode layer,
wherein
the light control layer includes a transparent polymer layer forming a polymer network such that the transparent polymer layer has voids formed in the polymer network and a liquid crystal composition including liquid crystal molecules filling the voids in the polymer network,
the polymer network of the transparent polymer layer in the light control layer has a three-dimensional mesh shape and comprises a polymer in which plural types of unit structures have been polymerized,
the unit structures include a unit structure comprising an aromatic ring, and
an average number of the aromatic ring in the unit structures in the transparent polymer layer is 0.4 or more per unit structure.

2. The light control sheet according to claim 1, wherein an absolute value of a difference between a refractive index of the transparent polymer layer and a refractive index of the spacers is 0.04 or less.

3. The light control sheet according to claim 2, wherein the transparent polymer layer has a three-dimensional mesh shape.

4. The light control sheet according to claim 2, wherein the plurality of spacers includes a plurality of particulate spacers.

5. The light control sheet according to claim 2, wherein the plurality of spacers includes a plurality of particulate spacers having a diameter substantially equal to a thickness of the light control layer.

6. The light control sheet according to claim 1, wherein the transparent polymer layer has a three-dimensional mesh shape.

7. The light control sheet according to claim 6, wherein an absolute value of a difference between a refractive index of the transparent polymer layer and a refractive index of the spacers is 0.09 or less.

8. The light control sheet according to claim 6, wherein an absolute value of a difference between a refractive index of the transparent polymer layer and a refractive index of the spacers is 0.05 or less.

9. The light control sheet according to claim 1, wherein the plurality of spacers includes a plurality of particulate spacers.

10. The light control sheet according to claim 1, wherein the plurality of spacers includes a plurality of particulate spacers having a diameter substantially equal to a thickness of the light control layer.

11. The light control sheet according to claim 1, wherein an absolute value of a difference between a refractive index of the transparent polymer layer and a refractive index of the spacers is 0.09 or less.

12. The light control sheet according to claim 1, wherein an absolute value of a difference between a refractive index of the transparent polymer layer and a refractive index of the spacers is 0.05 or less.

13. The light control sheet according to claim 1, wherein an absolute value of a difference between a refractive index of the transparent polymer layer and a refractive index of the spacers is 0.01 or less.

14. The light control sheet according to claim 1, wherein each of the first and second transparent substrates comprises transparent synthetic resin.

\* \* \* \* \*